(12) United States Patent
Petrunka

(10) Patent No.: US 6,298,127 B1
(45) Date of Patent: *Oct. 2, 2001

(54) CALL TRANSFER AND CONFERENCE WITH SEPARATE BILLING RECORDS PER LEG

(75) Inventor: Robert W. Petrunka, Raleigh, NC (US)

(73) Assignee: Nortel Networks Limited, Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/114,069

(22) Filed: Jul. 13, 1998

(51) Int. Cl.[7] .............. H04M 15/00; H04M 3/42
(52) U.S. Cl. ............. 379/126; 379/212; 379/115.01; 379/125.01
(58) Field of Search ............ 379/265, 266, 379/114, 212, 211, 210, 201, 202, 130, 112, 34, 221, 220, 309, 203, 223, 222

(56) References Cited

U.S. PATENT DOCUMENTS

| | | | |
|---|---|---|---|
| 5,517,560 | * 5/1996 | Greenspan | 379/114 |
| 5,617,471 | * 4/1997 | Rogers et al. | 379/212 |
| 5,684,867 | * 11/1997 | Gesslein et al. | 379/115 |
| 5,715,307 | * 2/1998 | Zazzara | 379/265 |
| 5,926,535 | * 7/1999 | Reynolds | 379/265 |

* cited by examiner

Primary Examiner—Curtis Kuntz
Assistant Examiner—Rexford Barnie

(57) ABSTRACT

A system efficiently transfers a telephone call from a caller terminal for a desired class of service and produces separate billing records for each leg of the call. The system includes a network level server connected to a network level switch. The network switch receives the call from the caller terminal and transmits information about the call to the network server. The network server produces a first directory number for the call based on the call information from the network switch. The network switch receives the first directory number from the network server, establishes a first connection from the caller terminal to a first terminal identified by the call using the first directory number, and creates a first billing record for the first connection. The network server receives a request to transfer the call to a second terminal from the first terminal and produces a second directory number for the call transfer. The network switch receives the second directory number from the network server, establishes a second connection to the second terminal using the second directory number, and creates a second billing record for the second connection.

62 Claims, 14 Drawing Sheets

CALL TRANSFER AND CONFERENCE WITH SEPARATE BILLING RECORDS PER LEG

BACKGROUND OF THE INVENTION

The present invention is directed generally to call routing, and more particularly, to a system that efficiently transfers telephone calls and provides separate billing records for each leg of the call.

Many times in the business world, it becomes necessary to transfer a telephone call from one terminating party to another. This is quite common in call center applications that customers typically reach by dialing toll free numbers, such as telephone numbers beginning with 800 or 888. In these cases, an agent at one location may transfer a call to an agent at another location who can better assist the customer. During the transfer, agents may briefly confer in order to exchange information about the customer before one of the agents drops out. In other cases, an agent for one business transfers the customer to an agent for another business after the first transaction completes. For instance, an airline reservation agent may offer to transfer the customer to an agent of a car rental agency after the customer completes a ticket reservation.

While conventional techniques offer quick call transfers, they have several disadvantages. One disadvantage is that conventional techniques typically transfer calls from the terminating location. The new call is effectively hairpinned (or tromboned) through the first terminating switch to the second terminating switch. The first terminating switch remains in the call until the call completes. This leads to an inefficient use of telephone company facilities.

Another disadvantage from the inefficient transfer of the calls is difficulty in billing for telephone companies. In the case of an airline call that is transferred to a car rental agency, the telephone company providing the toll free service would like to charge the first portion of the 800/888 call to the airline and the second portion to the car rental agency. However, the telephone company has no direct knowledge of the transfer and, therefore, cannot easily produce separate billing records.

FIG. 1 is a block diagram of a conventional communications network that performs call transfers. Tandem switch 1100 interconnects a customer telephone 1200 with an agent terminal, such as agent terminal 1300 or 1400, via the Public Switched Telephone Network (PSTN).

Customer telephone 1200 connects to a local Private Branch Exchange (PBX) or Class 5 telephone switch, such as local switch 1210, over a standard telephone line. Local switch 1210 connects to a Service Control Point (SCP) 1220 using a standard data connection. SCP 1220 contains directory numbers (DNs) for routing telephone calls through the network. Local switch 1210 also connects to tandem switch 1100 over the PSTN using facilities, such as a standard ISUP trunk.

The agent terminals might include a combination of a telephone and a personal computer, such as agent terminal 1300, or simply a telephony-capable personal computer, such as agent terminal 1400. Agent terminals 1300 and 1400 connect to tandem switch 1100 via the PSTN and respective local PBX or Class 5 telephone switches, such as local switches 1310 and 1410.

Agent terminals 1300 and 1400 also connect to respective local Computer Telephony Integrated (CTI) servers 1320 and 1420 via standard data connections, such as Ethernet or X.25 data connections. Local CTI servers 1320 and 1420 are computers that contain a data connection, such as an Ethernet or X.25 data connection, to local switches 1310 and 1410, respectively.

Tandem switch 1100 is a tandem level telephone switch connected to SCP 1120 and billing system 1140. SCP 1120 contains DNs for routing telephone calls through the network. Billing system 1140 is a database that maintains billing records for telephone calls routed through tandem switch 1100.

When a customer dials a toll free number on customer telephone 1200 to obtain service by an agent using agent terminal 1300, for example, customer telephone 1200 transmits the telephone call to local switch 1210. Local switch 1210 queries SCP 1220, using a technology such as Signaling System 7 (SS7), to perform local toll free processing. Based upon data, such as the dialed digits, the calling number, etc., SCP 1220 directs local switch 1210 to route the call through the PSTN to tandem switch 1100.

Upon receiving the call, tandem switch 1100 performs long distance SCP processing by querying SCP 1120, using a technology such as SS7. Based upon data, such as the dialed digits, the calling number, the time-of-day, etc., SCP 1220 directs tandem switch 1100 to route the call through the PSTN to local switch 1310.

In response, tandem switch 1100 connects customer telephone 1200 to agent terminal 1300 via local switch 1310. Local switch 1310 also transmits call data, such as the calling number and the dialed digits, to local CTI server 1320. Based on this data, CTI server 1320 populates the screen on agent terminal 1300 with information about the customer. The agent then converses with the customer and processes the call transaction.

If, during the course of call handling, the agent decides to transfer the call to a second agent, such as the agent using agent terminal 1400, the agent uses agent terminal 1300 to send a transfer command to local switch 1310 either directly or indirectly via CTI server 1320.

One way that local switch 1310 can complete the transfer is to route the call back into the PSTN. The call may very well route up to tandem switch 1100 and then back through the PSTN to agent terminal 1400 via local switch 1410. Once the connection is established, the agents may briefly converse before agent terminal 1300 drops out. Alternatively, the first agent may not confer with the second agent at all and drop out before the second agent answers. However, no matter when agent terminal 1300 drops out of the call, all of the voice communication facilities remain in effect until the customer ends the call. In other words, local switch 1310 and the voice facilities to and from this switch remain part of the connection for the duration of the call.

In an alternative technique, the connection is completed through the PSTN without involving tandem switch 1100. However, even if tandem switch 1100 is involved in the connection to agent terminal 1400, the connection appears as a new call to tandem switch 1100. Tandem switch 1100 does not recognize that the connection is merely a second leg to the original call.

In yet an another technique, private facilities are used to connect agent terminals 1300 and 1400, instead of the PSTN. Private facilities are more likely to be used if both agents work for the same company instead of partner companies. However, in all these alternatives, all the voice communication facilities to and from local switch 1310 remain in use until the customer ends the call.

When the customer eventually places customer telephone 1200 on-hook and ends the call, tandem switch 1100 produces a billing record and sends it to billing system 1140. The conversation time recorded in this billing record includes both the time that the customer spoke with the first agent, as well as the time that the customer spoke with the second agent. Tandem switch 1100 provides no information in the billing record that allows the telephone company to allocate the conversation time to each leg of the call.

As a result, a need exists to overcome the disadvantages of the conventional techniques and to provide cost efficient call transfers and accurate billing records.

SUMMARY OF THE INVENTION

Systems and methods consistent with the present invention address this need by extending a separate leg for each call from a network level switch to the terminating switches and providing separate billing records for each leg. This serves to minimize the use of voice facilities and solves the billing problems of the conventional techniques.

In accordance with the purpose of the invention as embodied and broadly described herein, a system consistent with the present invention efficiently transfers a telephone call from a caller terminal for a desired class of service and produces separate billing records for each leg of the call. The system includes a network level server connected to a network level switch.

The network switch receives the call from the caller terminal and transmits information about the call to the network server. The network server produces a first directory number for the call based on the call information from the network switch. The network switch receives the first directory number from the network server, establishes a first connection from the caller terminal to a first terminal identified by the call using the first directory number, and creates a first billing record for the first connection.

The network server receives a request to transfer the call to a second terminal from the first terminal and produces a second directory number for the call transfer. The network switch receives the second directory number from the network server, establishes a second connection to the second terminal using the second directory number, and creates a second billing record for the second connection.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention minimize the use of voice facilities required in a network for transferring a telephone call, while permitting separate billing records to be produced for each leg of the call. The systems and methods extend a separate leg for each call from a network level switch to the terminating switches and maintain individual billing records for each leg of the call.

EXEMPLARY NETWORK ELEMENTS

Figure 2:
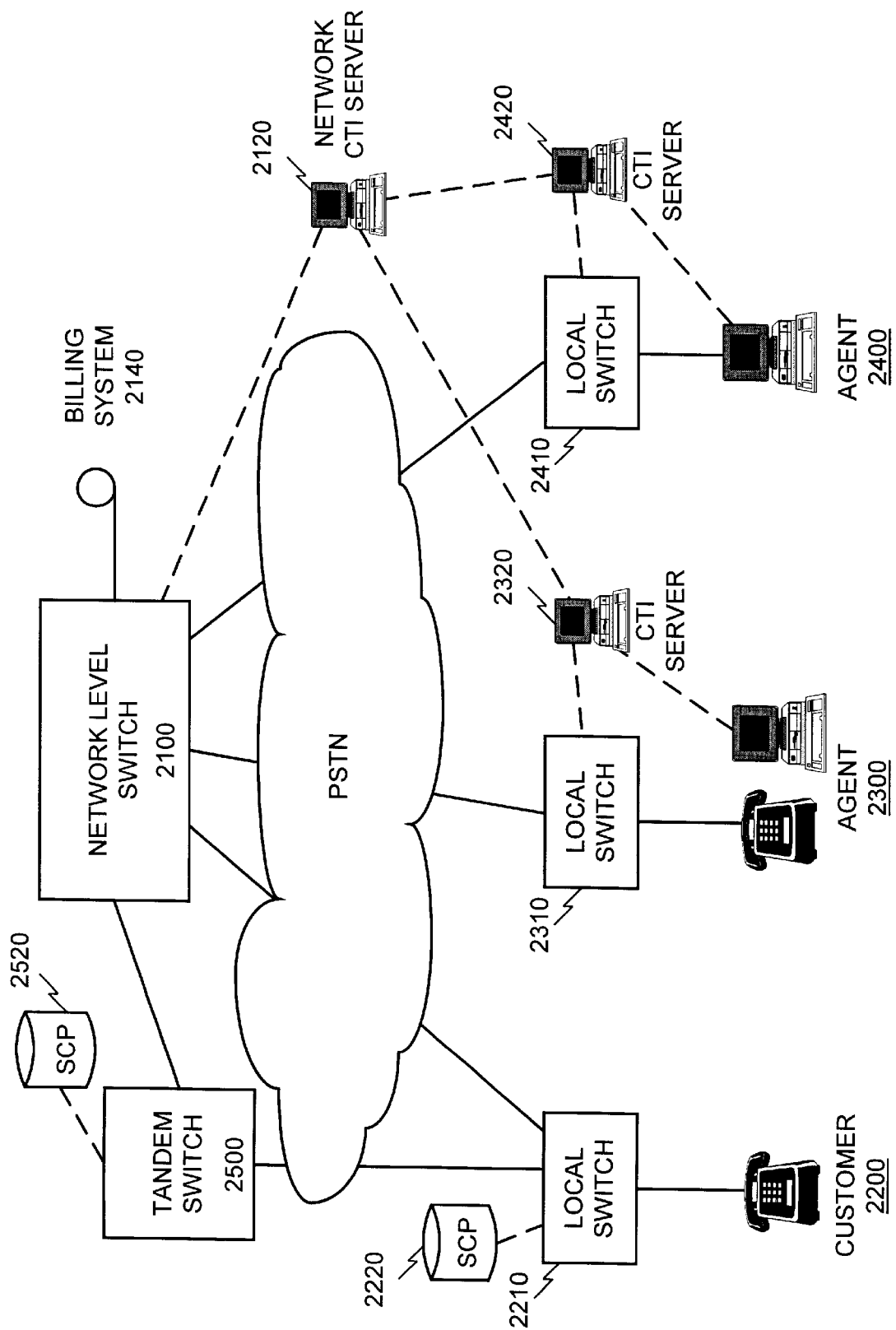
FIG. 2 is a diagram of an exemplary communications network consistent with the present invention.

FIG. 2 is a diagram of an exemplary communications network consistent with the present invention. Network level switch 2100 interconnects customer telephone 2200 with agent terminals 2300 and 2400 via the PSTN. A single customer telephone and only two agent terminals have been shown for simplicity. The present invention is not limited by the number of customer telephones or agent terminals present in the network.

Customer telephone 2200 may include any conventional telephone, mobile telephone, or computer terminal used to place a call requesting service by an agent. Customer telephone 2200 connects to local switch 2210 over a standard telephone line. Local switch 2210 is a standard PBX or Class 5 telephone switch that contains a data connection to SCP 2220. SCP 2220 is a database that contains DNs for routing telephone calls through the network.

Figure 1:
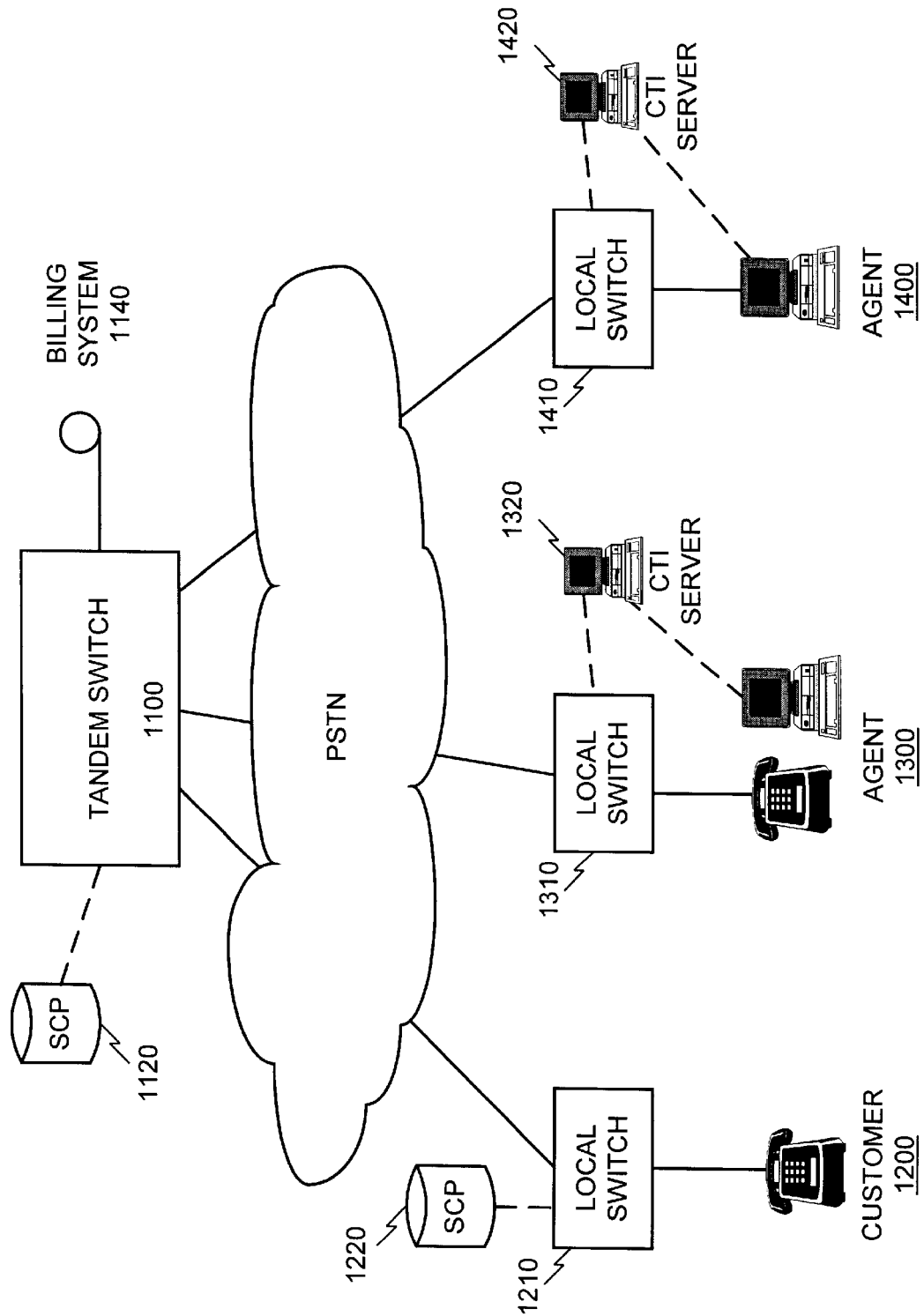
FIG. 1 is a diagram of a conventional communications network.

Local switch 2210 connects customer telephone 2200 to tandem switch 2500 over standard facilities, such as a GR394 ISUP trunk. Alternatively, local switch 2210 might connect directly to network level switch 2100, bypassing tandem switch 2500. Both connections are shown in FIG. 1.

Tandem switch 2500 is a tandem level telephone switch connected to network level switch 2100, and contains a data connection to SCP 2520. SCP 2520 is a database that contains DNs for routing telephone calls through the network.

Network level switch 2100 connects to agent terminals 2300 and 2400 via the PSTN and local switches 2310 and 2410, respectively. The agent terminals might include a combination of a telephone and a personal computer, such as agent terminal 2300, or simply a telephony-capable personal computer, such as agent terminal 2400.

Agent terminals 2300 and 2400 connect to local switches 2310 and 2410, respectively, over standard telephone lines. Local switches 2310 and 2410 are PBX or Class 5 telephone switches that connect agent terminals 2300 and 2400, respectively, to network level switch 2100 over standard facilities, such as GR394 ISUP trunks.

Agent terminals 2300 and 2400 also connect to respective local CTI servers 2320 and 2420 via standard data connections, such as Ethernet or X.25 data connections. Local CTI servers 2320 and 2420 include computers that contain a data connection, such as an Ethernet or X.25 data connection, to local switches 2310 and 2410, respectively.

Network level switch 2100, consistent with the present invention, contains a data connection, such as an Ethernet-equivalent data connection, to network CTI server 2120, and connects to billing system 2140. Network level switch 2100 is a network level telephone switch that executes advanced call control software, such as Operator Services System Advanced Intelligent Network (OSSAIN) software deployed in Digital Multiplex System (DMS) Traffic Operator Position System (TOPS) switches manufactured by Northern Telecom, Ltd. The call control software permits network level switch 2100 to allow network CTI server 2120 to control the telephone switch.

Network CTI server 2120 includes a computer, such as an IBM-compatible computer executing Windows NT™, but might alternatively comprise a UNIX™-capable computer, such as an HP model or the IBM Risc 6000. Network CTI server 2120 contains a data connection, such as an Ethernet-equivalent data connection, to network level switch 2100, and a Wide Area Network (WAN) data connection to local CTI servers 2320 and 2420. Billing system 2140 is a database that maintains billing records for telephone calls routed through network level switch 2100.

EXEMPLARY CALL TRANSFER PROCESSING

Figure 3A:
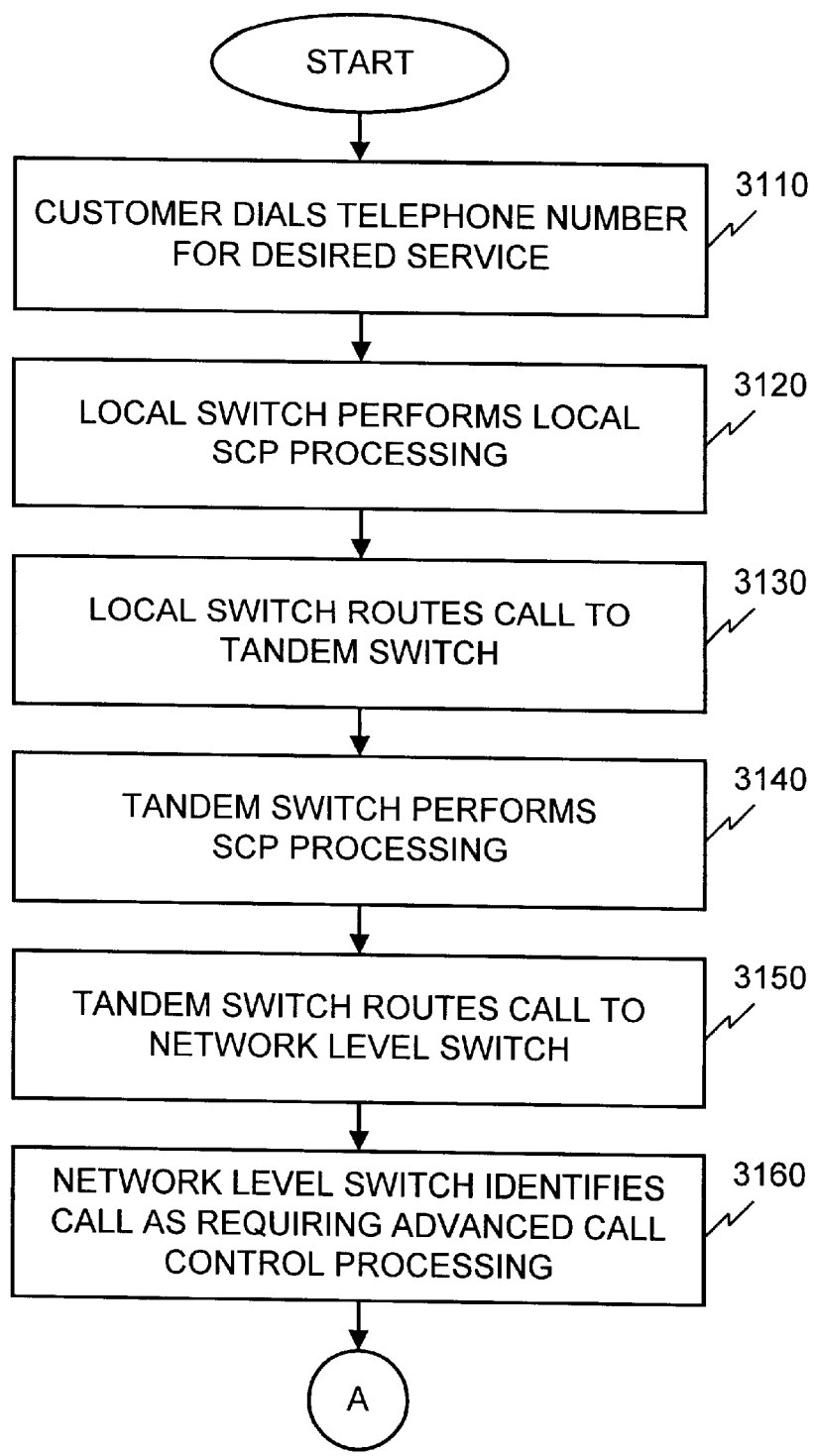
FIGS. 3A–5B are flowcharts of exemplary call transfer processing occurring in the communications network of FIG. 2.

FIGS. 3A–5B are flowcharts of exemplary call transfer processing occurring in the communications network of FIG. 2. A customer, using, for example, customer telephone 2200, places a toll free call for a service provided by an agent, using, for example, agent terminal 2300 [step 3110] (FIG. 3A). Local switch 2210 receives the call from customer telephone 2200 and makes a query to SCP 2220 using call data, such as the dialed digits, the calling number, etc., to perform local toll free processing [step 3120]. SCP 2220 returns data indicating that local switch 2210 should direct the call to tandem switch 2500. Local switch 2210 routes the call to tandem switch 2500 [step 3130].

Upon receiving the call, tandem switch 2500 makes a query to SCP 2520 using call data, such as the dialed digits, the calling number, etc., to perform long distance processing [step 3140]. SCP 2520 returns data indicating that tandem switch 2500 should direct the call to network level switch 2100. Tandem switch 2500 routes the call to network level switch 2100 [step 3150].

Using translations software based upon the incoming trunk group or the called number transmitted by tandem switch 2500, network level switch 2100 identifies the call as one requiring advanced call control processing [step 3160]. In response, network level switch 2100 assigns a call identifier (CALLID) to the call [step 3210] (FIG. 3B), and then establishes a data session with network CTI server 2120 [step 3220]. During this data session, network level switch 2100 transmits call data, including the CALLID, the calling number, and the called number, to network CTI server 2120 [step 3230].

Based upon information supplied by local CTI servers, network CTI server 2120 supplies network level switch 2100 with a DN that corresponds to local switch 2310 [step 3240], and instructs network level switch 2100 to route the call to this local switch [step 3250]. Before signaling, network CTI server 2120 may also supply network level switch 2100 with a new calling number to guarantee that the calling number that is signaled through the PSTN is unique. Network level switch 2100 uses the unique calling number to coordinate transmission of the call with the terminating switch (i.e., local switch 2310).

Figure 3B:
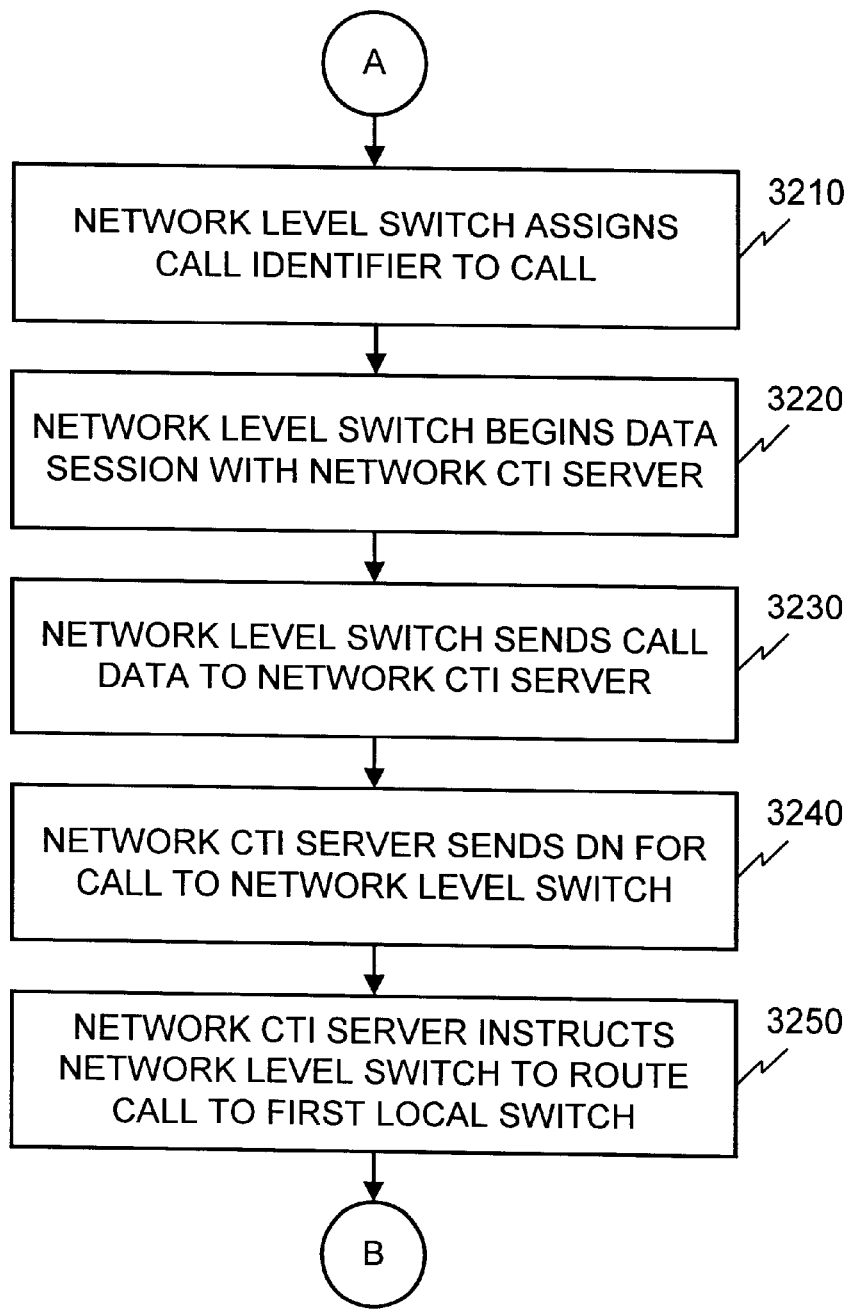
Figure 3C:
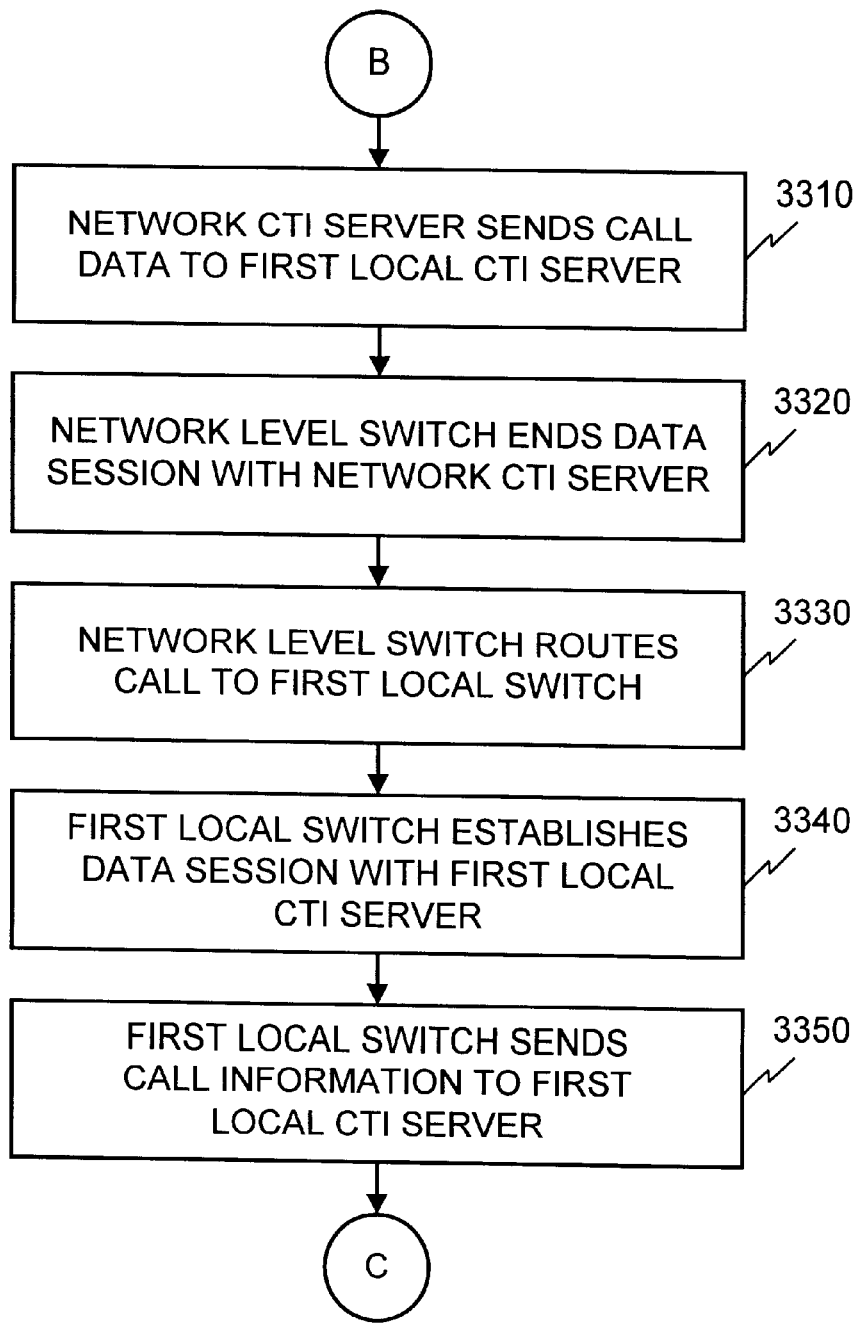

Network CTI server 2120 transmits the CALLID it received from network level switch 2100 and the calling and called numbers to local CTI server 2320 over its data connection [step 3310] (FIG. 3C). At this point, network level switch 2100 ends the data session with network CTI server 2120, and network CTI server 2120 relinquishes call control to network level switch 2100 [step 3320].

Figure 3D:
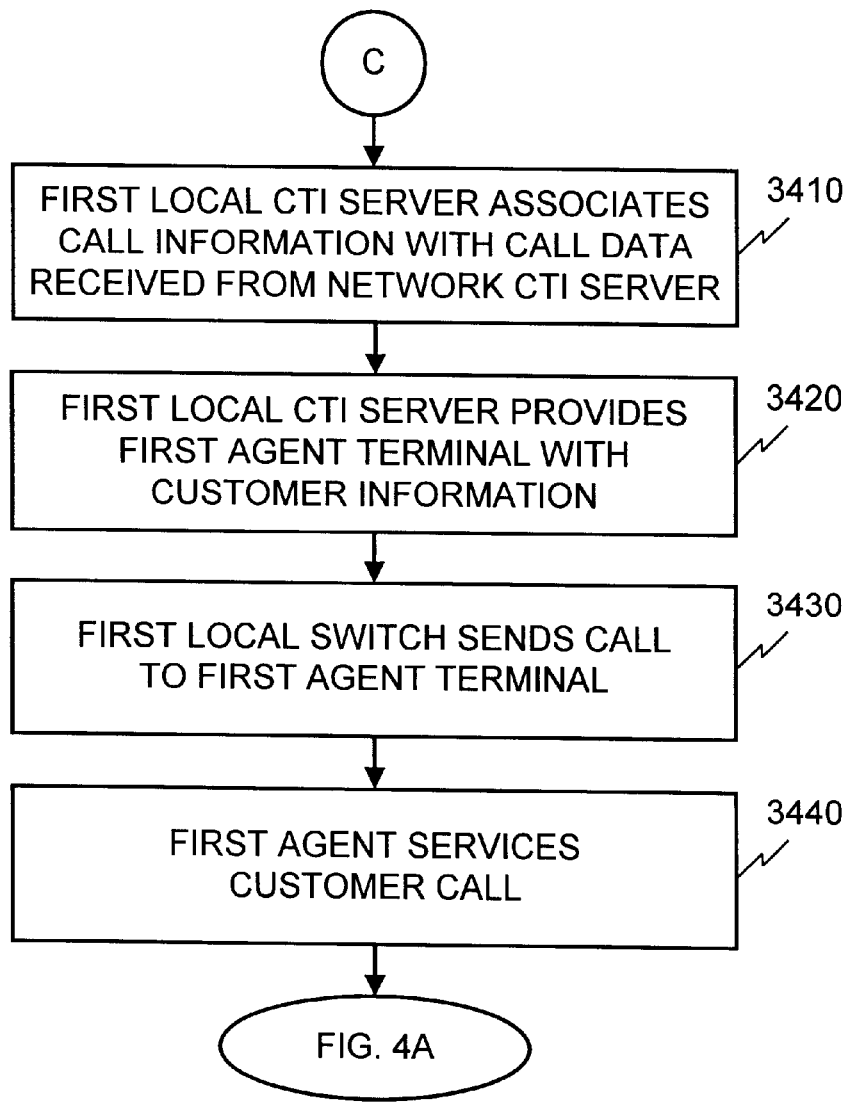

Network level switch 2100 then signals the call, the calling number, and the called number through the PSTN, using technology such as SS7, until the information reaches local switch 2310 [step 3330]. When local switch 2310 receives the call, it establishes a data session with local CTI server 2320 [step 3340]. During this data session, local switch 2310 transmits the calling and called numbers it received from the PSTN to local CTI server 2320 [step 3350]. Local CTI server 2320 associates this information with the call data that it received from network CTI server 2120 [step 3410] (FIG. 3D).

At this point, local CTI server 2320 populates the screen of agent terminal 2300 with customer information, including, for example, the calling and called numbers [step 3420], and local switch 2310 routes the call to agent terminal 2300 [step 3430]. The agent then converses with the customer to service the customer's call [step 3440].

Figure 4A:
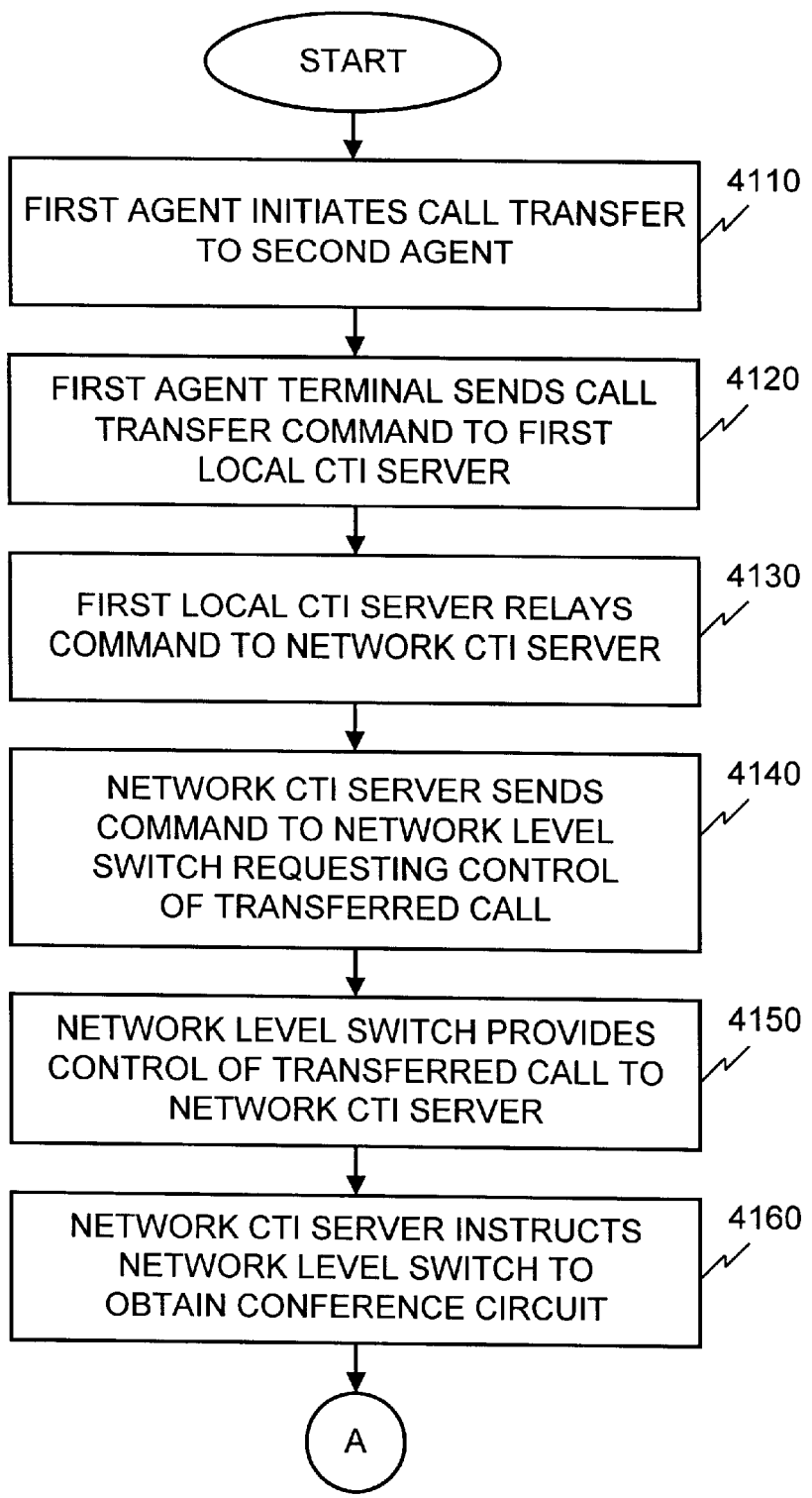
Figure 4B:
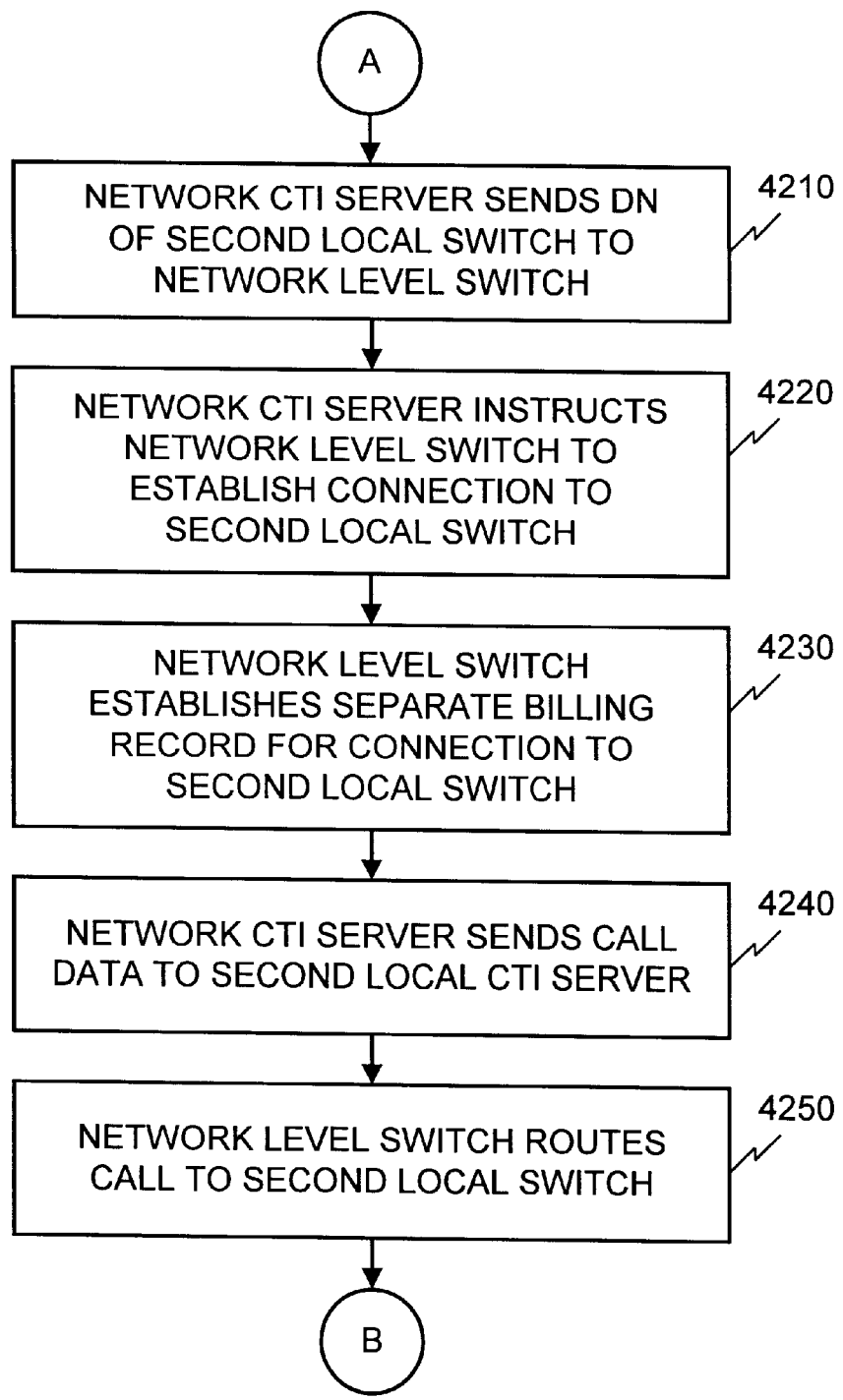

Eventually, the agent determines that another agent with different skills, such as the agent operating agent terminal 2400, is required by the customer. The agent then initiates a transfer to the other agent by keystroke action or by clicking on a button using a mouse, and by obtaining the telephone number of the other agent either through manual input or automatic generation by agent terminal 2300 [step 4110] (FIG. 4A). Agent terminal 2300 transmits the transfer command over the data connection to local CTI server 2320 [step 4120].

Local CTI server 2320 receives the command and, in turn, relays it along with the CALLID assigned to the call by network level switch 2100, to network CTI server 2120, indicating the need for transfer/conference service [step 4130]. When network CTI server 2120 receives the command, it sends a command to network level switch 2100 requesting control of the call with the indicated CALLID [step 4140]. Provided that the call is still up (i.e., in a talking state), network level switch 2100 responds positively and gives network CTI server 2120 control of the call [step 4150].

Once in control of the call, network CTI server 2120 instructs the network level switch 2100 to obtain a three port conference circuit and to bridge the voice facilities to customer telephone 2200 and agent terminal 2300 into this circuit [step 4160]. A three port conference circuit is a conventional device that allows three parties to converse simultaneously.

Network CTI server 2120 also supplies network level switch 2100 with a DN for a terminating switch, such as local switch 2410, that is connected to an agent with the skills required by the customer [step 4210] (FIG. 4B), and instructs network level switch 2100 to set up a connection to this local switch [step 4220]. Network level switch 2100 adds this connection to the conference circuit.

As the connection is set up, network level switch 2100 maintains separate billing data, including the conversation time on this new call leg, for the connection to local switch 2410 [step 4230]. In the meantime, network CTI server 2120 transmits call context data, including data collected by the agent using agent terminal 2300, such as the customer's credit card number, to local CTI server 2420 [step 4240].

Figure 4C:
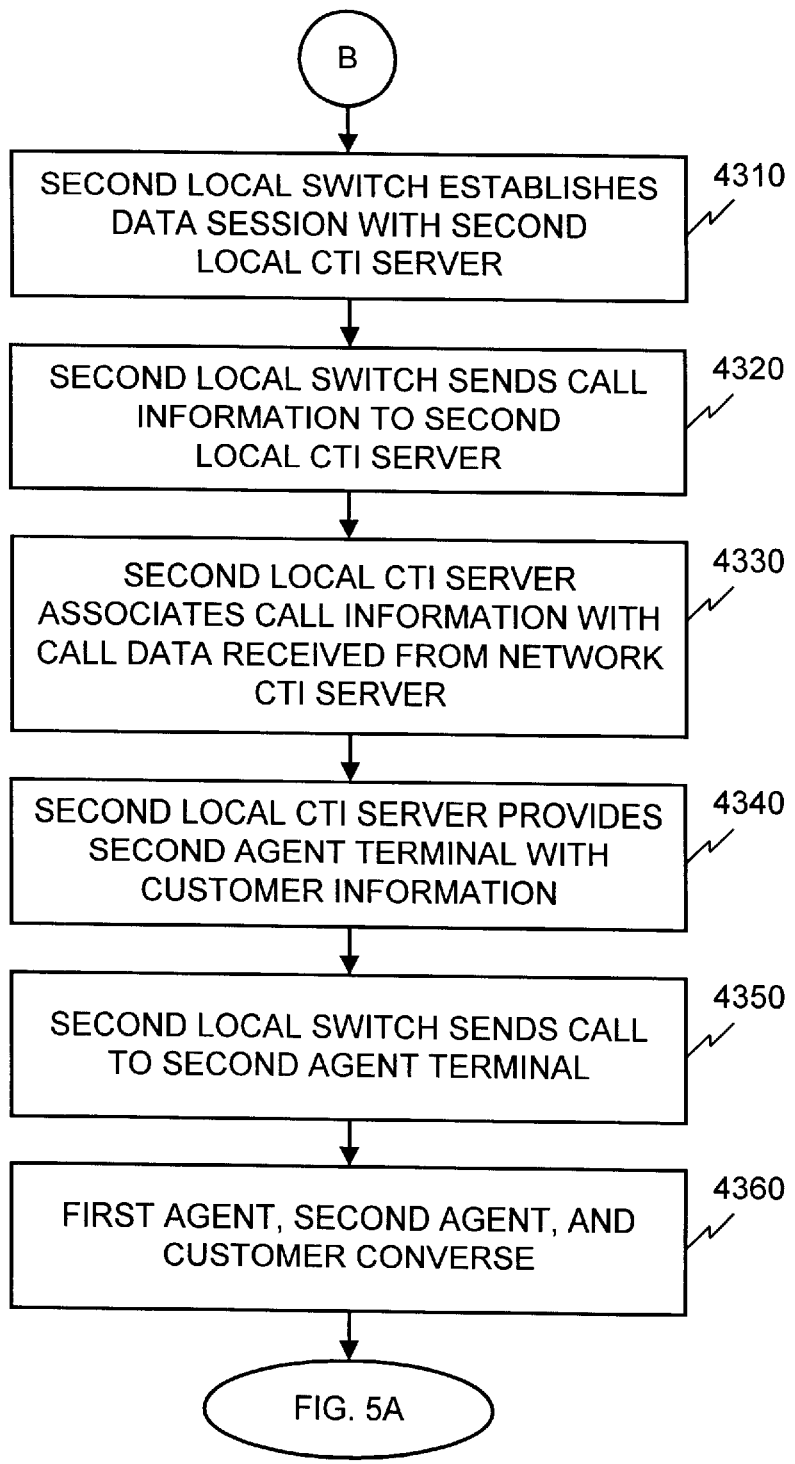

Network level switch 2100 then routes the call to local switch 2410 via the PSTN [step 4250]. When the call reaches local switch 2410, it establishes a data session with local CTI server 2420 [step 4310] (FIG. 4C). Local switch 2410 sends call information, including the calling and called numbers, to local CTI server 2420 [step 4320]. Local CTI server 2420 associates the call information with the call data from network CTI server 2120 [step 4330], and uses this information to populate agent terminal 2400 [step 4340].

In addition to sending the call information to local CTI server 2420, local switch 2410 connects agent terminal 2400 to the call [step 4350]. Once the agent answers, all three parties can converse [step 4360]. If desired, the initial connection can be set up so that the customer cannot hear, and the two agents can converse privately.

Figure 5A:
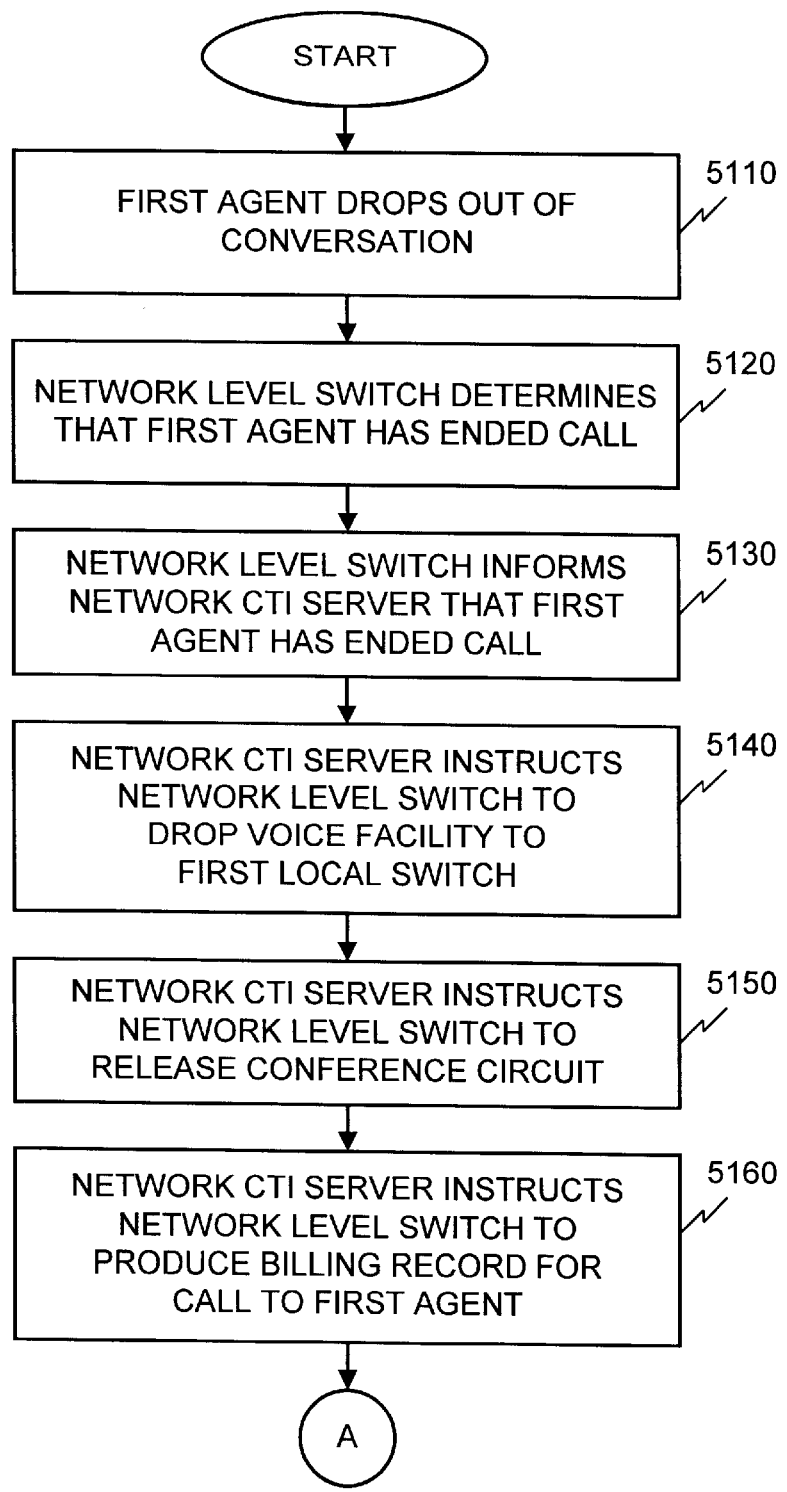

In the normal course of events, the agent using agent terminal 2300 goes on-hook and drops out of the conversation [step 5110] (FIG. 5A). This event propagates through the PSTN to network level switch 2100 [step 5120] which, in turn, relays it to network CTI server 2120 [step 5130]. Network CTI server 2120 instructs network level switch 2100 to drop the voice facility between the switch and local switch 2310 [step 5140]. It also instructs network level switch 2100 to release the conference circuit and connect the voice facility from customer telephone 2200 directly to the voice facility to agent terminal 2400 [step 5150].

Figure 5B:
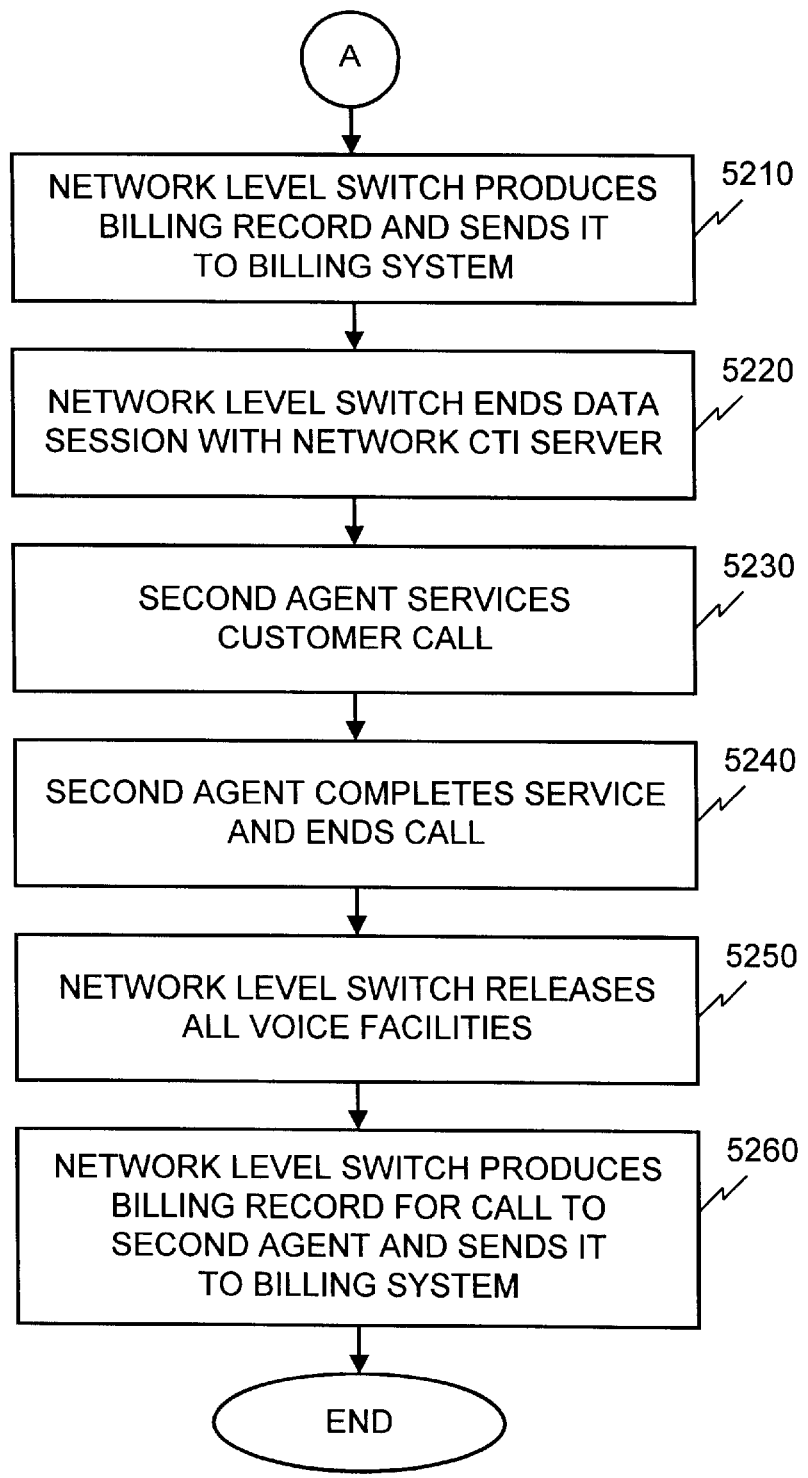

Network CTI server 2120 then instructs network level switch 2100 to produce a billing record for the first leg of the call [step 5160]. Network level switch 2100 produces a billing record for the call between customer telephone 2200 and agent terminal 2300, reflecting the actual time that the customer and the agent conversed, and transmits it to billing system 2140 [step 5210] (FIG. 5B). Network level switch 2100 then ends the data session with network CTI server 2120 [step 5220].

As network level switch 2100 produces the billing record for the first leg of the call, the agent, using agent terminal 2400, services the customer call [step 5230]. When the service concludes [step 5240], network level switch 2100 releases all voice facilities [step 5250]. Finally, network level switch 2100 produces a second billing record, showing the actual time that customer telephone 2200 and agent terminal 2400 were connected, and transmits it to billing system 2140 [step 5260].

Alternative Network Elements and Call Transfer Processing

Figure 6:
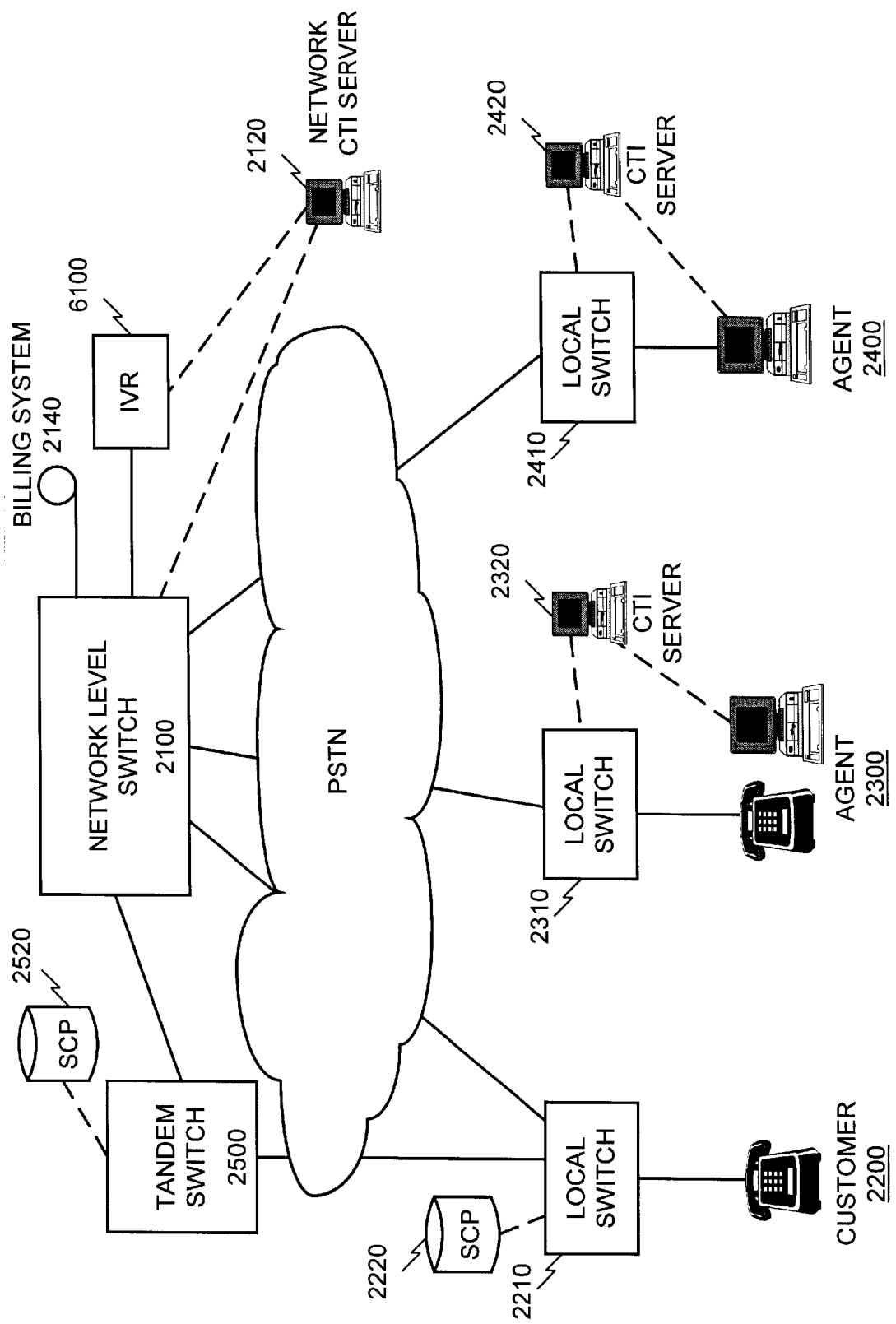
FIG. 6 is a diagram of an exemplary communications network in an alternative implementation consistent with the present invention.

FIG. 6 is a diagram of an exemplary communications network in an alternative implementation consistent with the present invention. The diagram of FIG. 6 is identical to the diagram of FIG. 2, except for the inclusion of Interactive Voice Response (IVR) unit 6100 and the removal of the data connections between network CTI server 2120 and local CTI servers 2320 and 2410.

IVR 6100 includes a computer, such as a personal computer or a larger mainframe computer, with a voice connection to network level switch 2100 and a data connection, such as an Ethernet-equivalent data connection, to network CTI server 2120. IVR 6100 contains the ability to receive dual tone multi-frequency (DTMF) tones, to decipher a transfer telephone number from the received DTMF tones, and to send the transfer telephone number to network CTI server 2120.

The description accompanying FIGS. 3A–5B describes an operation by which an agent initiates a call transfer request by sending call transfer information from agent terminal 2300 to network level switch 2100 via local CTI server 2320 and network CTI server 2120. Alternatively, agent terminal 2300 sends the call transfer information directly to network level switch 2100 via the PSTN.

In this alternative implementation, call set-up occurs as previously described with regard to FIGS. 3A–3C. However, in step 3250, when network CTI server 2120 instructs network level switch 2100 to route the call, it also instructs the switch to monitor the connection to agent terminal 2300 for predetermined DTMF signals of at least 500 milliseconds in duration, such as "#" or "*" signals capable of being output from a conventional telephone. Network level switch 2100 monitors for a signal of at least 500 milliseconds in duration to prevent conflicts with other voice processing and IVR systems that may be present in the network.

Figure 7A:
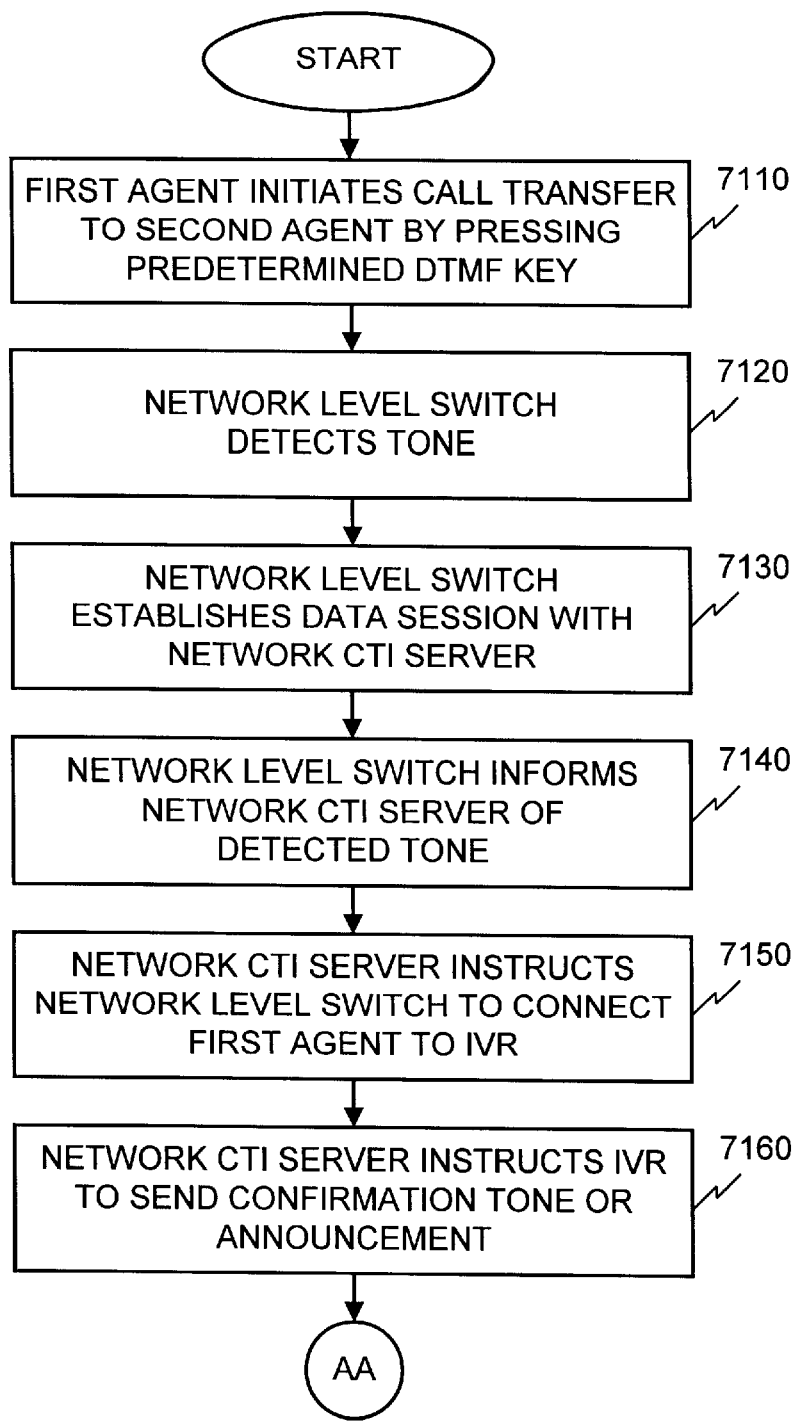
FIGS. 7A and 7B show a flowchart of call transfer operations in the alternative implementation consistent with the present invention.
Figure 7B:
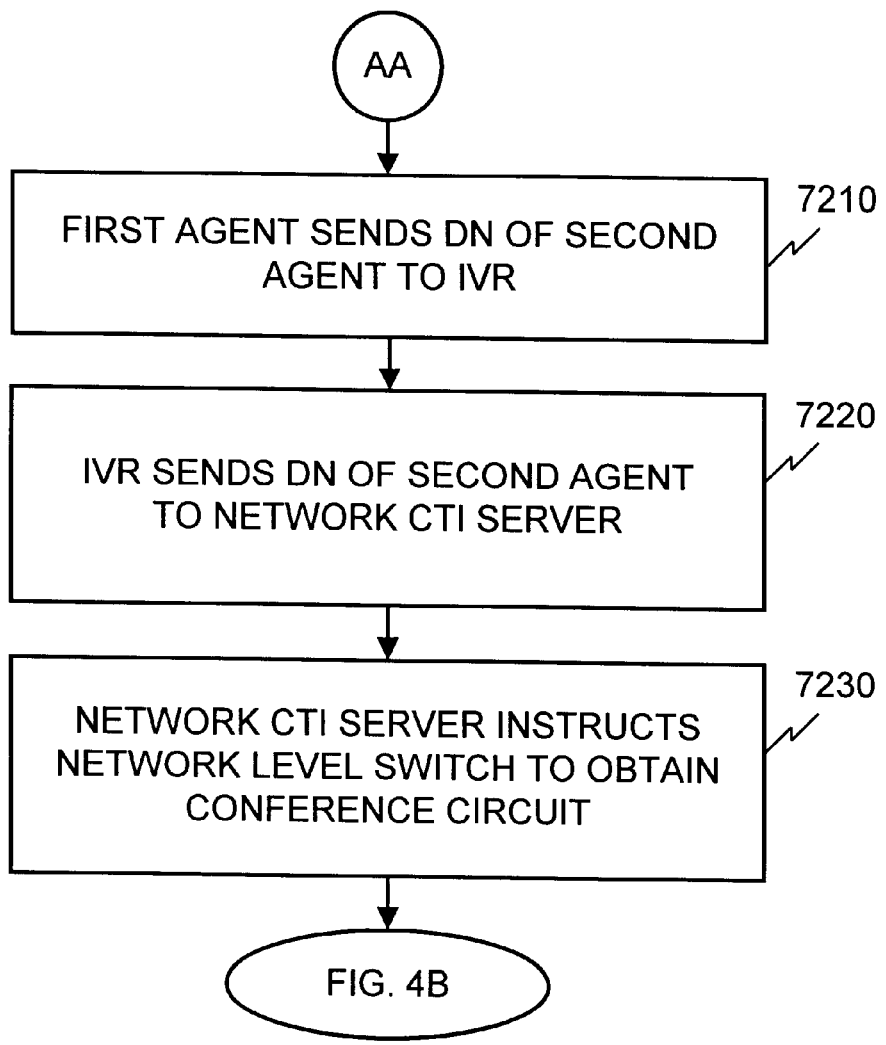

FIGS. 7A and 7B show a flowchart of call transfer operations in the alternative implementation consistent with the present invention. The flowchart of FIGS. 7A and 7B corresponds to the flowchart of FIG. 4A.

When the agent operating agent terminal 2300 determines that the call should be transferred to another agent, the agent depresses a predetermined DTMF key, such as the "#" or "*" key, for at least 500 milliseconds [step 7110] (FIG. 7A). As a result, agent terminal 2300 transmits a corresponding DTMF signal to network level switch 2100 via local switch 2310 and the PSTN.

Network level switch 2100 detects the DTMF signal [step 7120] and, in response, establishes a data session with network CTI server 2120 [step 7130]. Network level switch 2100 thereafter informs network CTI server 2120 that it detected the predetermined DTMF signal [step 7140].

Network CTI server 2120 interprets detection of the predetermined DTMF signal by the network level switch 2100 as a request to transfer a call. As a result, network CTI server 2120 instructs network level switch 2100 to establish a voice path between agent terminal 2300 and IVR 6100 [step 7150]. At this time, network CTI server 2120 may also instruct network level switch 2100 to connect customer telephone 2200 to IVR 6100 so that IVR 6100 can play music or announcements for the customer while the agent communicates with IVR 6100.

Once the agent is connected to IVR 6100, network CTI server 2120 instructs IVR 6100 to transmit a confirmation tone or announcement, informing the agent to enter the telephone number for the agent to which the call will be transferred [step 7160]. Upon hearing the confirmation tone or announcement, the agent enters the number using standard DTMF keying [step 7210] (FIG. 7B). IVR 6100 relays the telephone number to network CTI server 2120 [step 7220]. In response, network CTI server 2120 instructs network level switch 2100 to obtain a three port conference circuit, and to bridge the voice facilities to customer telephone 2200 and agent terminal 2300 into this circuit [step 7230]. Processing then proceeds as described above beginning with step 4210 in FIG. 4B.

Conclusion

The systems and methods consistent with the present invention facilitate call transfers between agents servicing a customer's call while efficiently using network facilities and permitting separate billing records to be produced for each leg of the call. The foregoing description provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, FIG. 2 shows separate tandem and network level switches, but the tandem level switch can execute the advanced call control software and perform the operations described above with respect to the network level switch. FIG. 2 also shows that the local switches connect to the tandem and network level switches via the PSTN, but private facilities could be used instead.

Furthermore, while the preceding description described the agents as conversing at the beginning of the call transfer, this does not always happen. If the two agents involved in the call do not need to speak, the transfer can be implemented without the need for a three port conference circuit. However, separate billing records are still produced for each leg of the call.

What is claimed is:

1. A method for transferring a telephone call, comprising the steps of:

receiving, at a network level switch, a call for a desired class of service from a caller terminal;

transmitting information about the call to a network level server;

sending a first directory number for the call from the network server to the network switch;

establishing a first connection from the caller terminal to a first terminal identified by the call using the first directory number;

creating, at the network level switch, a first billing record for the first connection;

sending, by the network level switch, the first billing record to a billing system connected to the network level switch;

receiving, at the network server, a request to transfer the call to a second terminal from the first terminal;

sending a second directory number for the call transfer from the network server to the network switch;

establishing a second connection to the second terminal using the second directory number;

creating, at the network level switch, a second billing record for the second connection; and sending, by the network level switch, the second billing record to the billing system.

2. The method of claim 1, wherein the step of receiving a call includes the substeps of:

recognizing at the network switch, that the call is for the desired class of service, and initiating a data session between the network switch and the network server.

3. The method of claim 1, wherein the step of receiving a request to transfer the call includes the substeps of:

signaling the network switch by the network server requesting control of the call transfer, and obtaining control of the call transfer by the network server.

4. The method of claim 1, wherein the step of establishing a second connection includes the substep of:

creating a three-way connection simultaneously connecting the caller terminal and the first and second terminals.

5. The method of claim 4, wherein the step of establishing a second connection further includes the substeps of:

releasing the first connection, and directly connecting the caller terminal to the second terminal.

6. The method of claim 5, wherein the step of creating a first billing record includes the substep of:

generating the first billing record to reflect time that the caller terminal and the first terminal are connected.

7. The method of claim 1, wherein the step of transmitting information about the call includes the substeps of:

generating a call identifier in the network switch, and sending the call identifier to the network server.

8. The method of claim 1, wherein the step of receiving a request to transfer the call includes the substeps of:

receiving, at the network switch, a predetermined dual tone multi-frequency signal from the first terminal, connecting the first terminal to an interactive voice response unit, receiving, at the interactive voice response unit, the second directory number from the first terminal, and sending the second directory number to the network server from the interactive voice response unit.

9. A system for transferring a telephone call of a caller terminal for a desired class of service, comprising:

a network level server including means for receiving information about the call, means for producing a first directory number for the call based on the received call information, means for receiving a request to transfer the call to a second terminal from a first terminal identified by the call, and means for obtaining a second directory number for the call transfer; and a network level switch, connected to the network server, including means for receiving the call from the caller terminal, means for transmitting the information about the call to the network server, means for receiving the first directory number from the network server, means for establishing a first connection from the caller terminal to the first terminal using the first directory number, means for creating a first billing record for the first connection, means for sending the first billing record to a billing system connected to the network level switch;

means for receiving the second directory number from the network server, means for establishing a second connection to the second terminal using the second directory number, means for creating a second billing record for the second connection; and means for sending the second billing record to the billing system, wherein the first billing record is sent independent of the second billing record.

10. The system of claim 9, wherein the means for receiving the call includes means for recognizing that the call is for the desired class of service, and means for initiating a data session with the network server.

11. The system of claim 10, wherein the means for receiving a request to transfer the call includes means for signaling the network switch to request control of the call transfer, and means for obtaining control of the call transfer.

12. The system of claim 9, wherein the means for establishing a second connection includes means for creating a three-way connection simultaneously connecting the caller terminal and the first and second terminals.

13. The system of claim 12, wherein the means for establishing a second connection further includes means for releasing the first connection, and means for directly connecting the caller terminal to the second terminal.

14. The system of claim 13, wherein the means for creating a first billing record includes means for generating the first billing record to reflect only time that the first connection is intact.

15. The system of claim 10, wherein the means for transmitting information about the call includes means for generating a call identifier, and means for sending the call identifier to the network server.

16. The system of claim 9, further comprising an interactive voice response unit connected to the network server and the network switch.

17. The system of claim 16, wherein the network switch further includes means for receiving a predetermined dual tone multi-frequency signal from the first terminal, and means for connecting the first terminal to the interactive voice response unit.

18. The system of claim 17, wherein the interactive voice response unit includes means for receiving the second directory number from the first terminal, and means for sending the second directory number to the network server.

19. A method of transferring a telephone call of a caller terminal from a first terminal identified by the call to a second terminal in a network having a network level switch connected to a network level server, the method, performed in the network switch, comprising the steps of:

receiving the call from the caller terminal;

transmitting information about the call to the network server;

receiving a first directory number from the network server in response to the transmitted call information;

establishing a first connection from the caller terminal to the first terminal using the first directory number;

creating a first billing record for the first connection;

sending the first billing record to billing system connected to the network level switch;

receiving a second directory number from the network server;

establishing a second connection to the second terminal using the second directory number;

creating a second billing record for the second connection; and sending the second billing record to the billing system.

20. The method of claim 19, wherein the step of receiving the call includes the substeps of:

recognizing that the call is for a desired class of service, and initiating a data session with the network server.

21. The method of claim 19, wherein the step of establishing a second connection includes the substep of:

creating a three-way connection simultaneously connecting the caller terminal and the first and second terminals.

22. The method of claim 21, wherein the step of establishing a second connection further includes the substeps of:

releasing the first connection, and directly connecting the caller terminal to the second terminal.

23. The method of claim 22, wherein the step of creating a first billing record includes the substep of:

generating the first billing record to reflect time that the first connection is intact.

24. The method of claim 19, wherein the step of transmitting information about the call includes the substeps of:

generating a call identifier, and sending the call identifier to the network server.

25. In a network that transfers a telephone call of a caller terminal from a first terminal identified by the call to a second terminal, having a network level switch connected to a network level server, the network switch comprising:

means for receiving the call from the caller terminal;

means for transmitting information about the call to the network level server;

means for receiving a first directory number from the network server in response to the transmitted call information;

means for establishing a first connection from the caller terminal to the first terminal using the first directory number;

means for creating a first billing record for the first connection;

means for sending the first billing record to a billing system connected to the network level switch;

means for receiving a second directory number from the network server;

means for establishing a second connection to the second terminal using the second directory number;

means for creating a second billing record for the second connection; and means for sending the second billing record to the billing system, wherein the first billing record is sent to the billing system independently of the second billing record.

26. The network switch of claim 25, wherein the means for receiving the call includes means for recognizing that the call is for a desired class of service, and means for initiating a data session with the network server.

27. The network switch of claim 25, wherein the means for establishing a second connection includes means for creating a three-way connection simultaneously connecting the caller terminal and the first and second terminals.

28. The network switch of claim 27, wherein the means for establishing a second connection further includes means for releasing the first connection, and means for directly connecting the caller terminal to the second terminal.

29. The network switch of claim 28, wherein the means for creating a first billing record includes means for generating the first billing record to reflect time that the first connection is intact.

30. The network switch of claim 25, wherein the means for transmitting information about the call includes means for generating a call identifier, and means for sending the call identifier to the network server.

31. A method of transferring a telephone call of a caller terminal from a first terminal identified by the call to a second terminal in a network having a network level switch connected to a network level server, the method, performed in the network server, comprising the steps of:

receiving information about the call from the network switch;

obtaining a first directory number for the call based on the received call information;

instructing the network switch to establish a first connection from the caller terminal to the first terminal using the first directory number, create a first billing record for billing a first organization associated with the first connection and send the first billing record to a billing system;

receiving a request to transfer the call to the second terminal from the first terminal;

producing a second directory number for the call transfer; and instructing the network switch to establish a second connection to the second terminal using the second directory number, create a second billing record for billing a second organization associated with the second connection and send the second billing record to the billing system.

32. The method of claim 31, wherein the step of receiving a request to transfer the call includes the substeps of:

signaling the network switch to request control of the call transfer, and obtaining control of the call transfer.

33. The method of claim 31, wherein the step of instructing the network switch to establish a second connection includes the substep of:

instructing the network switch to create a three-way connection simultaneously connecting the caller terminal and the first and second terminals.

34. The method of claim 33, wherein the step of instructing the network switch to establish a second connection further includes the substeps of:

instructing the network switch to drop the first connection, and instructing the network switch to directly connect the caller terminal to the second terminal.

35. In a network that transfers a telephone call of a caller terminal from a first terminal identified by the call to a second terminal, having a network level switch connected to a network level server, the network server comprising:

means for receiving information about the call from the network switch;

means for producing a first directory number for the call based on the received call information;

means for instructing the network switch to establish a first connection from the caller terminal to the first terminal using the first directory number, create a first billing record for the first connection and send the first billing record to a billing system;

means for producing a second directory number for the call transfer; and means for instructing the network switch to establish a second connection to the second terminal using the second directory number, create a second billing record for the second connection and send the second billing record to the billing system;

wherein the first and second billing records are sent to the billing system independently of each other.

36. The network server of claim 35, wherein the means for receiving a request to transfer the call includes means for signaling the network switch to request control of the call transfer, and means for obtaining control of the call transfer.

37. The network server of claim 35, wherein the means for instructing the network switch to establish a second connection includes means for instructing the network switch to create a three-way connection simultaneously connecting the caller terminal and the first and second terminals.

38. The network server of claim 37, wherein the means for instructing the network switch to establish a second connection further includes means for instructing the network switch to drop the first connection, and means for instructing the network switch to directly connect the caller terminal to the second terminal.

39. A method for transferring a telephone call, comprising the steps of:

receiving at a network level switch, a call for a desired class of service from a caller terminal;

establishing a first data session between the network level switch and a network level server;

transmitting call data reflecting information about the call from the network level switch to the network level server;

sending a first directory number for the call from the network level server to the network level switch;

sending the first call data to a first local level server connected to a first terminal identified by the call;

ending the first data session between the network level server and the network level switch;

establishing a first connection from the caller terminal to the first terminal using the directory number;

receiving, at the network level server, a request to transfer the call to a second terminal from the first terminal;

creating, at the network level switch, a first billing record for the first connection;

sending, by the network level switch, the first billing record to a billing system connected to the network level switch;

sending a second directory number for the call transfer from the network level server to the network level switch;

establishing a second connection to the second terminal using the second directory number;

creating, at the network level switch, a second billing record for the second connection;

sending, from the network level server, second call data to a second local level server connected to the second terminal identified by the transfer request;

sending the call to the second terminal; and sending, by the network level switch, the second billing record to the billing system.

40. The method of claim 39, wherein establishing a first connection includes:

routing the call from the network level switch to a first local level switch connected to the first terminal and the first local level server;

sending call information from the first local level switch to the first local level server;

providing, by the first local level server, customer information to the first terminal; and sending the call from the first local level switch to the first terminal.

41. The method of claim 40, wherein providing customer information to the first terminal includes:

associating, by the first local level server, the call information received from the first local level switch with the call data received from the network level server; and generating the customer information in response to the association.

42. The method of claim 39, wherein establishing a second connection includes:

creating a three-way connection simultaneously connecting the call terminal and the first and second terminals;

releasing the first connection; and directly connecting the caller terminal and the second terminal.

43. The method of claim 39, wherein receiving a request to transfer includes:

receiving, at the first local level server, a call transfer command from the first terminal; and sending the call transfer command to the network level server.

44. A system for transferring a telephone call of a caller terminal from a first terminal identified by the call to a second terminal in a network having a network level switch connected to a network level server, and first and second local servers connected to the network level server, wherein the first and second local servers are respectively connected to the first and second terminals, the system comprising:

means for receiving at the network level switch, a call for a desired class of service from the caller terminal;

means for establishing a first data session between the network level switch and the network level server;

means for transmitting call data reflecting information about the call from the network level switch to the network level server;

means for sending a first directory number for the call from the network level server to the network level switch;

means for sending the first call data to a first local level server connected to a first terminal identified by the call;

means for ending the first data session between the network level server and the network level switch;

means for establishing a first connection from the caller terminal to the first terminal using the directory number;

means for receiving, at the network level server, a request to transfer the call to the second terminal from the first terminal;

means for creating, at the network level switch, a first billing record for the first connection;

means for sending, by the network level switch, the first billing record to a billing system;

means for sending a second directory number for the call transfer from the network level server to the network level switch;

means for establishing a second connection to the second terminal using the second directory number;

means for creating, at the network level switch, a second billing record for the second connection;

means for sending, from the network level server, second call data to the second local level server connected to the second terminal identified by the transfer request;

means for sending the call to the second terminal; and means for sending, by the network level switch, the second billing record to the billing system, wherein the second billing record is sent independent of the first billing record.

45. The system of claim 44, wherein the means for establishing a first connection includes:

means for routing the call from the network level switch to a first local level switch connected to the first terminal and first local level server;

means for sending call information from the first local level switch to the first local level server;

means for providing, by the first local level server, customer information to the first terminal; and means for sending the call from the first local level switch to the first terminal.

46. The system of claim 45, wherein the means for providing customer information to the first terminal includes:

means for associating, by the first local level server, the call information received from the first local level switch with the call data received from the network level server; and means for generating the customer information in response to the association.

47. The system of claim 44, wherein the means for establishing a second connection includes:

means for creating a three-way connection simultaneously connecting the call terminal and the first and second terminals;

means for releasing the first connection; and means for directly connecting the caller terminal and the second terminal.

48. The system of claim 44, wherein the means for receiving a request to transfer includes:

means for receiving, at the first local level server, a call transfer command from the first terminal; and means for sending the call transfer command to the network level server.

49. A method for transferring a telephone call, comprising the steps of:

receiving at a network level switch, a call for a desired class of service from a caller terminal;

sending a first directory number for the call from a network level server to the network level switch;

establishing a first connection from the caller terminal to a first terminal using the directory number;

receiving, at the network level server, a request to transfer the call to a second terminal from the first terminal;

creating, at the network level switch a first billing record for the first connection;

sending, by the network level switch, the first billing record to a billing system;

sending a second directory number for the call transfer from the network level server to the network level switch;

establishing a second connection to the second terminal using the second directory number; and creating, by the network level switch, a second billing record for the second connection;

releasing the second connection in response to the call ending; and sending, by the network level switch, the second billing record to the billing system, wherein the second billing record is sent to the billing system independent of the first billing record.

50. A system for transferring a telephone call, comprising:
- means for receiving at a network level switch, a call for a desired class of service from a caller terminal;
- means for sending a first directory number for the call from the network level server to the network level switch;
- means for establishing a first connection from the caller terminal to a first terminal using the directory number;
- means for receiving, at the network level server, a request to transfer the call to a second terminal from the first terminal;
- means for creating, at the network level switch a first billing record for the first connection;
- means for sending, by the network level switch, the first billing record to a billing system;
- means for sending a second directory number for the call transfer from the network level server to the network level switch;
- means for establishing a second connection to the second terminal using the second directory number; and
- means for creating, by the network level switch, a second billing record for the second connection;
- means for releasing the second connection in response to the call ending; and
- means for sending, by the network level switch, the second billing record to the billing system, wherein the second billing record is sent to the billing system independent of the first billing record.

51. A method for transferring a telephone call, comprising the steps of:
- receiving a call from a caller terminal;
- establishing a first connection from the caller terminal to a first terminal;
- creating, at a network level switch, a first billing record for billing a first organization associated with the first connection;
- sending by the network level switch, the first billing record to a billing system;
- receiving a request to transfer the call to a second terminal from the first terminal;
- establishing a second connection to the second terminal;
- creating, at the network level switch, a second billing record for billing a second organization associated with the second connection; and
- sending, by the network level switch, the second billing record to the billing system.

52. A system for transferring a telephone call, comprising:
- means for the receiving a call from a caller terminal;
- means for establishing a first connection from the caller terminal to a first terminal;
- means for creating, at a network level switch, a first billing record for billing a first organization associated with the first connection;
- means for sending, by the network level switch, the first billing record to a billing system;
- means for receiving a request to transfer the call to a second terminal from the first terminal;
- means for establishing a second connection to the second terminal;
- means for creating, at the network level switch, a second billing record for billing a second organization associated with the second connection; and
- means for sending, by the network level switch, the second billing record to the billing system.

53. The method of claim 1, wherein the step of creating a second billing record includes the substep of:
- generating the second billing record to reflect time that the caller terminal and the second terminal are connected, without referring to the first billing record.

54. The system of claim 9, wherein the means for creating a second billing record includes:
- means for generating the second billing record, without referring to the first billing record, wherein the second billing record reflects only time that the caller terminal and the second terminal are connected.

55. The method of claim 19, wherein the step of creating a second billing record includes the substep of:
- generating the second billing record to reflect time that the caller terminal and the second terminal are connected, without referring to the first billing record.

56. The network switch of claim 25, wherein the means for creating a second billing record includes.
- means for generating the second billing record, without referring to the first billing record, wherein the second billing record reflects time that the caller terminal and the second terminal are connected.

57. The method of claim 51, wherein the second billing record is created without referring to the first billing record.

58. The system of claim 52, wherein the second billing record is created without referring to the first billing record.

59. A method for transferring a telephone call, comprising:
- receiving a call for a requested service from a caller terminal;
- establishing a first connection from the caller terminal to a first terminal associated with a first business organization;
- creating, at a network level switch, a first billing record to bill the first organization associated with the first terminal for the first connection;
- sending, by the network level switch, the first billing record to a billing system;
- transferring the call from the first terminal to a second terminal associated with a second business organization unrelated to the first business organization;
- establishing a second connection between the caller terminal and the second terminal;
- creating, by the network level switch, a second billing record to bill the second organization associated with the second terminal for the second connection; and
- sending, by the network level switch, the second billing record to the billing system wherein the first billing record is used to bill the first business organization and the second billing record is used to bill the second business organization.

60. The method of claim 59, wherein the first connection is released when the second connection is established, wherein releasing the first connection includes releasing all voice facilities associated with the first terminal.

61. A system for transferring a telephone call, comprising:

a customer terminal, connected to a network, for producing a call for a requested service;

a first terminal for processing the call from the customer terminal and for transferring the call, wherein the first terminal is associated with a first business organization;

a second terminal for receiving the transferred call, wherein the second terminal is associated with a second business organization unrelated to the first business organization;

a network level switch for establishing a first connection between the customer terminal and the first terminal, based on the requested service, for creating a first billing record to bill the first organization associated with the first terminal for the first connection, for establishing a second connection between the customer terminal and the second terminal and creating a second billing record to bill the second organization associated with the second terminal for the second connection independent of the first billing record; and a billing system for receiving from the network level switch, the first billing record and second billing record.

62. The system of claim 61, wherein the network level switch is configured to release all voice facilities with the first terminal when the second connection is established.

* * * * *